(12) United States Patent
Summers

(10) Patent No.: US 6,392,844 B1
(45) Date of Patent: May 21, 2002

(54) SINGLE PIECE SUSPENSION WITH SELF-HINGED FLEXURE

(75) Inventor: Robert Summers, Temecula, CA (US)

(73) Assignee: Magnecomp Corp., Temecula, CA (US)

( * ) Notice: Subject to any disclaimer, the term of this patent is extended or adjusted under 35 U.S.C. 154(b) by 25 days.

(21) Appl. No.: 09/607,255

(22) Filed: Jun. 30, 2000

Related U.S. Application Data

(60) Provisional application No. 60/199,032, filed on Apr. 21, 2000.

(51) Int. Cl.⁷ .................................................. G11B 5/48
(52) U.S. Cl. .................................. 360/245.5; 360/244.5
(58) Field of Search .............................. 360/245.5, 245, 360/245.2, 245.3, 244.5

(56) References Cited

FOREIGN PATENT DOCUMENTS

| JP | 59-193581 | * 11/1984 | .............. 360/245.5 |
| JP | 7-105649 | * 4/1995 | .............. 360/245.5 |

* cited by examiner

*Primary Examiner*—A. J. Heinz
(74) *Attorney, Agent, or Firm*—Louis J. Bachand

(57) ABSTRACT

A single piece suspension and actuator arm includes a load beam having an integrated flexure and hinge each formed of the same web as the load beam, the flexure being foldable at the hinge to lie over the load beam engaged therewith to secure the flexure in its folded over condition. The load beam defines an additional attachment structure that attaches to cooperating attachment structure on the actuator arm, with one or more of the attachment structures comprising a tab and slot arrangement.

25 Claims, 5 Drawing Sheets

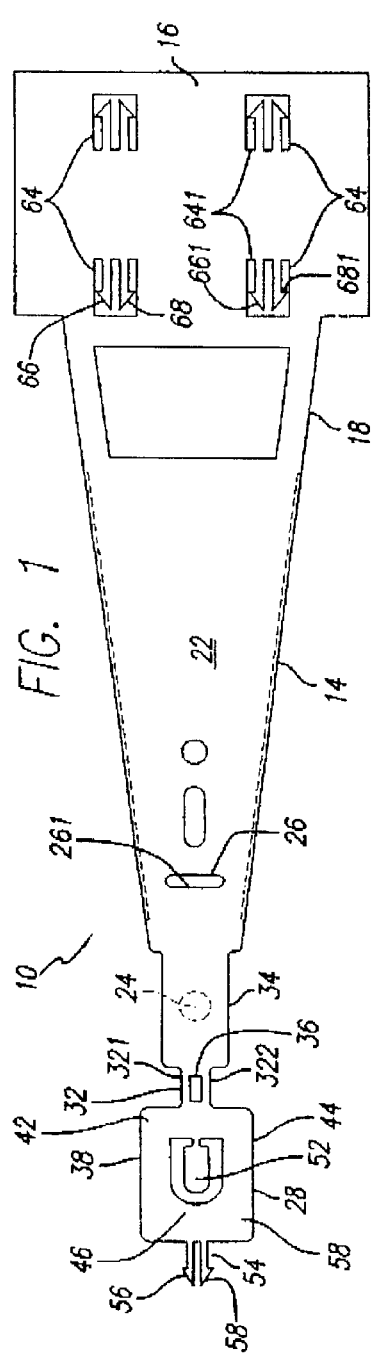
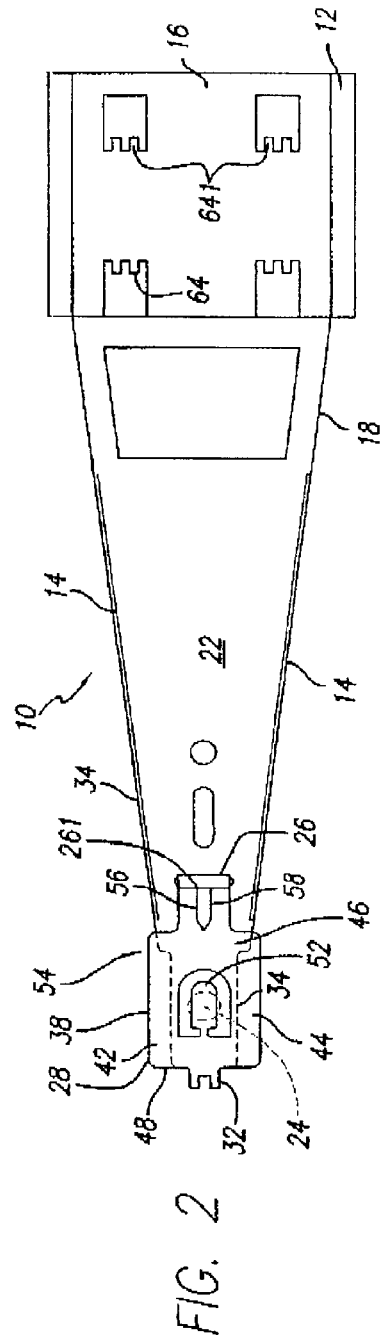
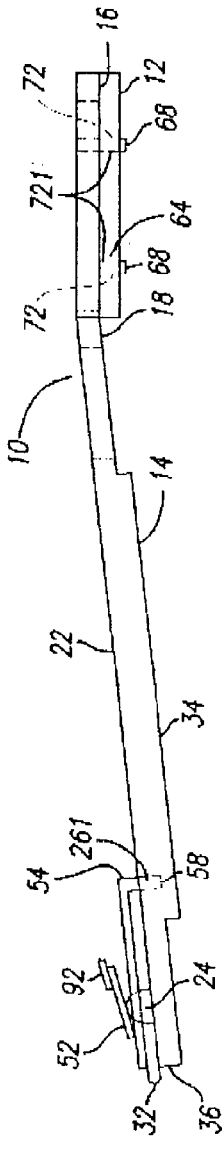

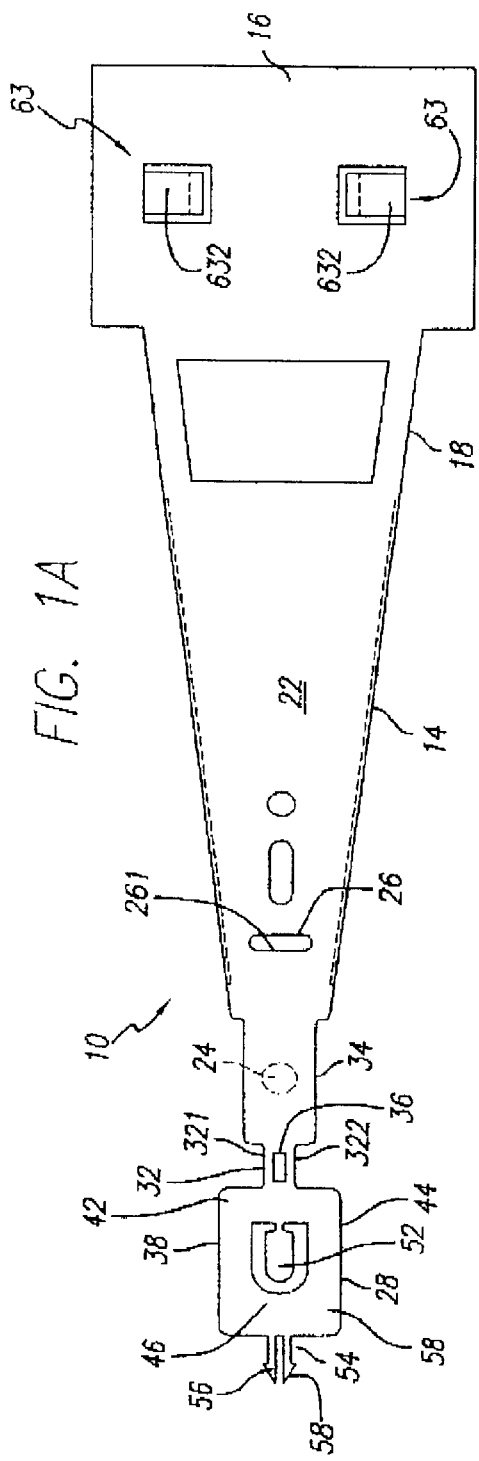
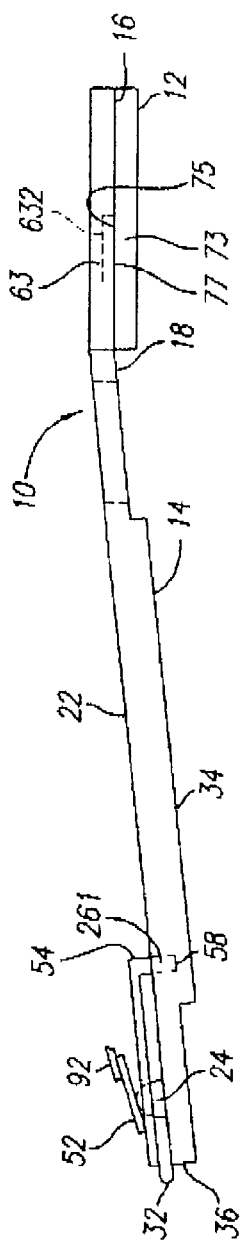

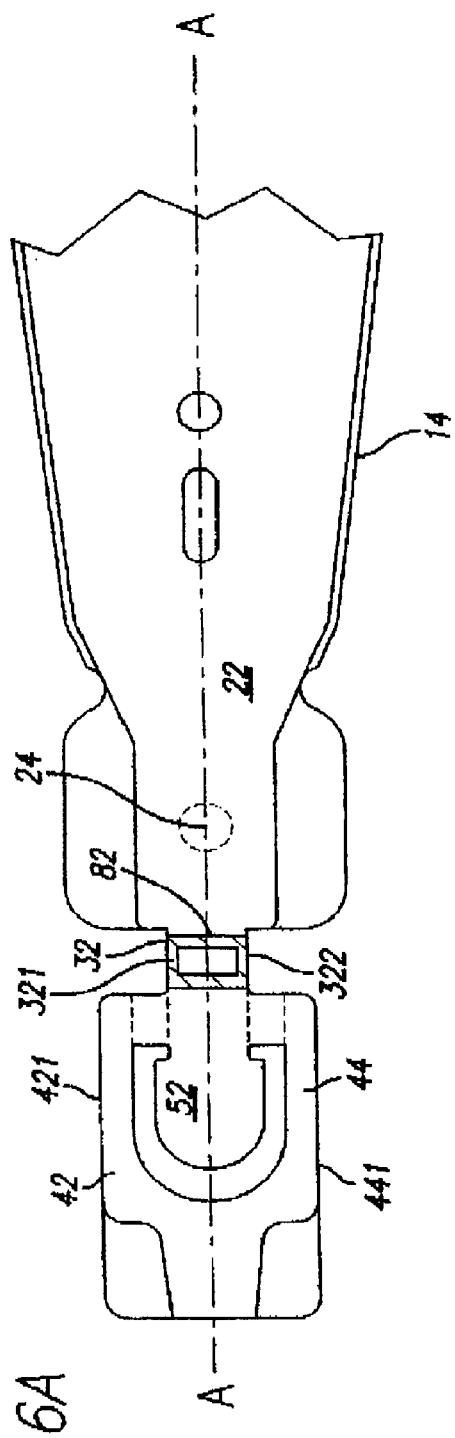
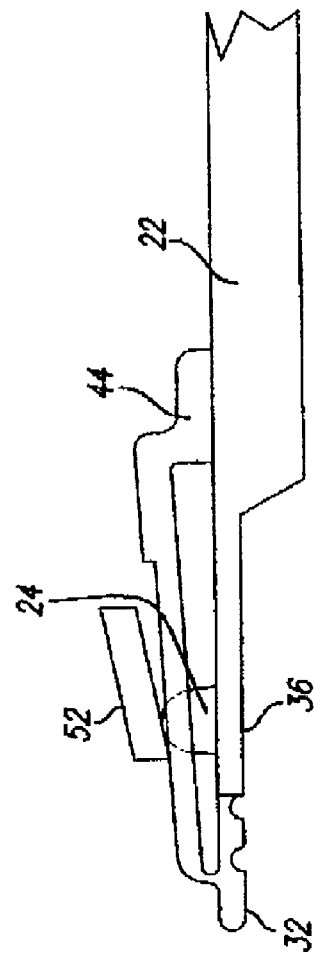
FIG. 6A
FIG. 6B

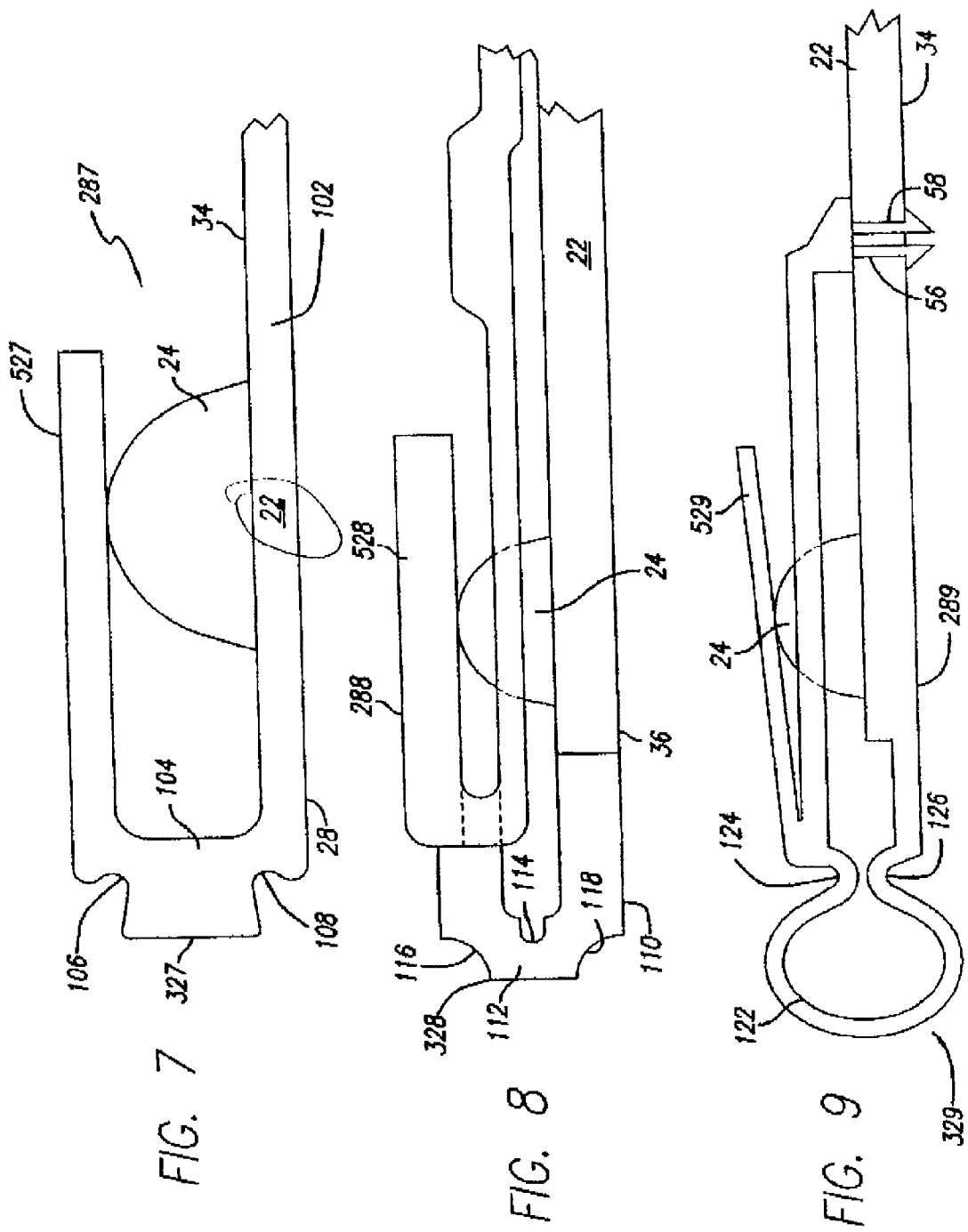

SINGLE PIECE SUSPENSION WITH SELF-HINGED FLEXURE

CROSS-REFERENCE TO RELATED APPLICATIONS

This application claims the benefit of U.S. provisional Application Ser. No. 60/199,032, filed Apr. 21, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to a single piece suspension for disk drive suspension.

2. Description of the Related Art

Disk drive suspensions typically comprise a load beam supported on an actuator arm by an actuator arm. A flexure is attached to the load beam to carry a slider and its electronics adjacent a disk. The cost of suspensions is desirably lessened to enable ever lower cost disk drives. Manufacturing expense is a substantial part of the suspension cost. The elimination of manufacturing steps, particularly steps requiring utmost precision and therefore time is desirable.

BRIEF SUMMARY OF THE INVENTION

It is an object of the invention, therefore, to provide an improved disk drive suspension, and at substantial cost savings through simplification of the manufacturing process and the elimination of unneeded process steps. It is a further object to integrate the load beam and flexure and the actuator arm attachment structure while maintaining the traditional flexure features of a tongue and frame in a separate plane from the load beam. It is a further object to provide novel hinging and fastening features that enable the ready manufacture of a single piece suspension that is snapped together from its flat, as-formed condition into its final configuration and snapped together with the actuator arm as well. It is a still further object to provide various hinging structures that will vary in stiffness and tongue orientation relative to the load beam and dimple for different levels of softness in springing of the slider.

These and other objects of the invention to become apparent hereinafter are realized in a single piece suspension attachable to an actuator arm, the suspension comprising a load beam having a base portion, a spring portion, and a rigid portion and rearwardly thereof a first attachment structure, the load beam having an integrated flexure and hinge each formed of the same web as the load beam, the hinge being disposed between the flexure and the distal end of the rigid portion; the flexure comprising a frame, a cantilevered tongue within the frame, the rigid portion or the tongue defining a dimple, and a second attachment structure complementary to first attachment structure, the flexure being foldable at the hinge to lie over and generally parallel with the rigid portion with the flexure tongue registered with the rigid portion dimple, the flexure second attachment structure being engaged with the first attachment structure to secure the flexure in its folded over condition to the load beam.

In this and like embodiments, typically, the load beam base portion defines a third attachment structure adapted to engage an actuator arm, the third attachment structure comprises a tab projecting normally to the base portion, and including also an actuator arm having a cooperating attachment structure for securing the base portion to the actuator arm, the cooperating attachment structure comprises a slot, the third attachment structure tab comprising deflectable prong sections that pass through the slot in deflected condition and lock in the slot in their undeflected condition for attaching the load beam base portion to the actuator arm, or in the alternative, the cooperating attachment structure comprises a first flat, the third attachment structure tab comprising a second flat opposing the first flat, the first and second flats being weldable to each other to attach the load beam base portion to the actuator arm.

In this and like embodiments, also, the first attachment structure comprises a slot, the second attachment structure comprising a tab projecting normally to the to the flexure and adapted to be received in the slot in attaching relation of the flexure to the rigid portion, the second attachment structure tab comprises deflectable prong sections that pass through the slot in deflected condition and lock in the slot in their undeflected condition for attaching the flexure to the rigid portion, and given the presence of the actuator arm, the load beam defines a third attachment structure comprising a tab projecting normally to the base portion, the actuator arm having a cooperating attachment structure for securing the base portion to the actuator arm. Preferably, in this embodiment, the cooperating attachment structure comprises a slot, the third attachment structure tab comprising deflectable prong sections that pass through the slot in deflected condition and lock in the slot in their undeflected condition for attaching the load beam base portion to the actuator arm.

Alternatively, the first attachment structure comprises a first flat, and the third attachment structure tab comprising a second flat opposing the first flat, the first and second flats being weldable to each other to attach the flexure to the rigid portion.

With respect to the hinge, typically the hinge comprises left and right elements spaced from and parallel to the long axis of the load beam, the elements being within a plane including the rigid portion and bounded by the outer edges of the flexure frame, the rigid portion has a center section extending distally, the hinge being supported by the center section. Alternatively, the hinge comprises left and right elements spaced from and parallel to the long axis of the load beam, the elements being without a plane including the rigid portion and bounded by the outer edges of the flexure frame. In the alternative embodiment, the rigid portion has a center section extending distally, and left and right outboard sections also extending distally parallel with and spaced from the center section, the outboard sections supporting the flexure, the outboard sections having opposed extents each defining the hinge. In this embodiment, preferably the outboard extents are etched to a lesser thickness than the outboard sections generally.

In a further embodiment, the invention provides a single piece suspension and actuator arm, the suspension comprising a load beam having a base portion, a spring portion, and a rigid portion defining a first attachment structure, the load beam having an integrated flexure and hinge each formed of the same web as the load beam, the hinge being disposed between the flexure and the distal end of the rigid portion; the flexure comprising a frame, a cantilevered tongue within the frame, and a second attachment structure complementary to first attachment structure, the flexure being foldable at the hinge to lie over angled to or and generally parallel with the rigid portion, the flexure second attachment structure being engaged with the first attachment structure to secure the flexure in its folded over condition to the load beam; a dimple between the rigid portion and the tongue, and third attachment structure defined by the base portion, the actuator arm defining cooperating attachment structure for attaching the load beam to the actuator arm by its the third attachment structure.

In this and like embodiments, typically, one or more of the attachment structures comprise a tab and slot arrangement, the tab comprises deflectable prong sections that pass through the slot in deflected condition and lock in the slot in their undeflected condition to effect attachment between the tab and slot, the flexure frame has longitudinal extents, the longitudinal extents being etched to have a lesser thickness than the flexure generally, the hinge is etched to have a lesser thickness than the rigid portion generally.

In particular embodiments, the hinge comprises a flat extent of the load beam web, the flat hinge extent has a center portion and distal and proximate transverse notches on opposite sides of the center portion, the center portion having a length such that the tongue lies parallel to the rigid portion in dimple engagement in the folded over condition of the flexure, the hinge being bent from the plane of the flexure and the rigid portion at the notches, or, alternatively the flat hinge extent has a center portion, a center notch, and distal and proximate transverse notches on opposite sides of the center portion notch, the center portion having a length such that the tongue lies parallel to the rigid portion in dimple engagement in the folded over condition of the flexure, the hinge being bent on itself at the center notch, or alternatively, the hinge comprises an arcuate extent formed from the load beam web, the arcuate extent having distal and proximate notches formed therein at its intersection with the flexure and the rigid portion, the notches being curved oppositely from the arcuate extent to provide resiliency in the hinging of the flexure to the rigid portion as a function of the flexing of the arcuate extent.

BRIEF DESCRIPTION OF THE SEVERAL VIEWS OF THE DRAWINGS

The invention will be further described in conjunction with the attached drawings in which:

FIG. 1 is a top plan view of the invention suspension load beam and flexure in flat form;

FIG. 2 is a top plan view of the load beam and flexure in folded condition;

FIG. 3 is a side elevation view of the load beam and flexure shown in FIG. 2;

FIG. 6A is a view like FIG. 1 of a further alternative embodiment;

FIG. 6B is a side elevation view of the embodiment shown in FIG. 6A;

FIG. 6C is an end view of the embodiment shown in FIG. 6A; and,

FIGS. 7, 8 and 9 are side elevation views of several hinge embodiments.

DETAILED DESCRIPTION OF THE INVENTION

Figure 4A:
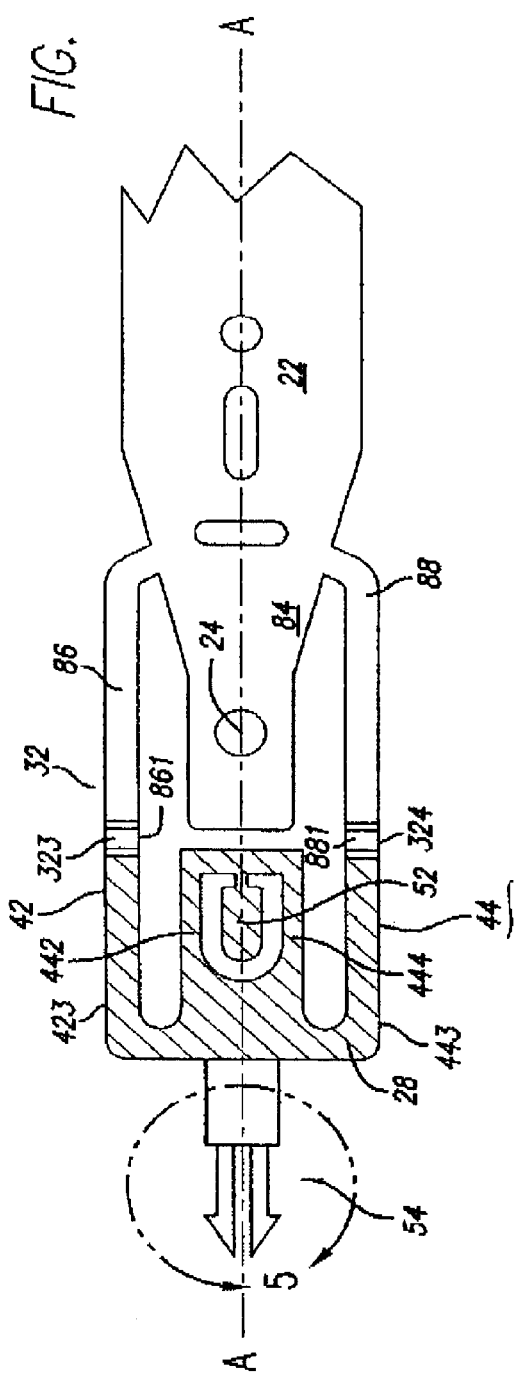
FIG. 4A is a view like FIG. 1 of an alternative embodiment.
Figure 5:
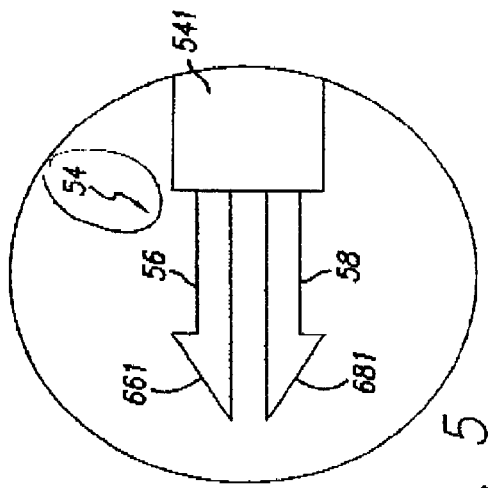
FIG. 5 is a detailed view of the prong attachment feature.

Typical suspension designs have been three-piece systems having a load beam, a flexure and mount or swage plate that are assembled by a laser welding process. These designs require that all three components be separately designed, manufactured and assembled. This then requires tooling to support all three components, such as the flexure form tooling, the load beam form tooling and the mount form tooling, and also weld tooling and laser equipment for assembly operation.

In the present invention, all three components are formed in a method requiring only one etch step and one form tool. The flexure can be mounted without welding or with welding. Suspension production costs are reduced by 40%. The suspension is mountable to an actuator arm without the need for swaging. Additionally, the herein disclosed suspension design provides a pitch restraint feature with no added structure.

With reference now to the drawings in detail, in FIGS. 1, 2, 3, and 5, the invention single piece suspension is shown at 10 attached to an actuator arm 12. Suspension 10 comprises a load beam 14 having a base portion 16, a spring portion 18, and a rigid portion 22 defining a dimple 24 (alternatively this can be formed on the flexure tongue 52) and rearwardly thereof (away from the load beam distal end and toward the load beam proximate end) a first attachment structure 26 depicted as slot 261.

Load beam 14 has an integrated flexure 28 and integrated hinge 32, each integrally formed from the same web 34 as the load beam. The hinge 32 is disposed between the flexure 28 and the distal end 36 of the load beam rigid portion 22.

Flexure 28 comprises a frame 38 having longitudinally disposed lateral elements 42, 44, and transverse distal and proximate elements 46, 48. A cantilevered tongue 52 extends within the frame 38. Flexure 28 defines a second attachment structure 54 that is complementary to the first attachment structure 26, that is, the first and second attachment structures will interfit or otherwise engage by themselves or with fastening aids such as welding. Flexure 28 is foldable at the hinge 32 to lie over and be angled to or generally parallel with the load beam rigid portion 22, Flexure tongue 52 registers with the rigid portion dimple 24. The flexure second attachment structure 54, here shown as a divided tab 541 having left and right prongs 56, 58, is registered with and, upon insertion, interlocks with the first attachment structure 26 to secure the flexure 28 in its folded-over condition to the load beam rigid portion 22.

The mounting of the load beam 14 to the actuator arm 12 is also improved with the present invention, using an embodiment of the slot and prong system shown for the attachment of the flexure 28 to the load beam. Thus, the load beam base portion 16 has formed therein a third attachment structure 64 shown here as comprising the mentioned divided tab 641 projecting normally to the base portion and comprising left and right prongs 66, 68. Actuator arm 12 has a cooperating attachment structure 72 for engaging the third attachment structure 64. In the present embodiment, the cooperating attachment structure 72 comprises a slot 721 that is sized to receive in locking relation the attachment structure 64. The third attachment structure prongs 66, 68 pass through the slot 721 in inwardly deflected condition and passing the overcenter condition outwardly deflect as their tooth portions 661, 681 pass the wall of the slot to lock in the slot in their undeflected condition for attaching the load beam base portion 16 to the actuator arm 12.

The base portion 16 can also be fastened to the arm 12 where the cooperating attachment structure 72 comprises a first flat 74 by having the third attachment structure 64 comprise tab 642 having a flat terminus 76 that defines a second flat 78, the first and second flats being weldable to each other to attach the load beam base portion 16 to the actuator arm 12.

With reference now to FIGS. 1–3, and 6A–6C, the hinge 32 comprises left and right elements 321, 322 spaced from and parallel to the long axis A—A of the load beam 14. Hinge elements 321, 322 are within a plane that includes the load beam rigid portion 22 and is bounded by the outer edges 421, 422 of the flexure frame lateral elements 42, 44. The load beam rigid portion 22 has a center section 82 extending distally that supports the hinge 32. The hinge areas are etched preferably to be of lesser thickness than the hinge generally.

Figure 4B:
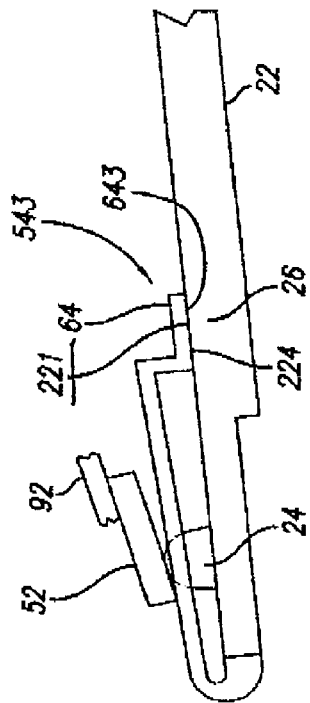
FIG. 4B is a side elevation view of the embodiment shown in FIG. 4A.

Alternatively, in FIGS. 4A–4C, the hinge 32 comprises left and right elements 323, 324 spaced from and parallel to the long axis A—A of the load beam 14, the elements being without (laterally beyond or outside of a plane that includes the load beam rigid portion 22 and is bounded by the outer edges 423, 443 of the flexure frame lateral elements 42, 44. Here, the load beam rigid portion 22 has a center section 84 extending distally but pretermitted and not connected to the flexure 28. Rigid portion left and right outboard sections 86, 88 also extending distally and are parallel with and spaced from the center section 84, to support the flexure 28. Outboard sections 86, 88 have opposed extents 861, 881 that together define the hinge elements 323, 324. Preferably the outboard extents 861, 881 are etched to a lesser thickness than the outboard sections 86, 88 generally. The flexure frame lateral extents 42, 44 are also preferably etched as indicated by the cross-hatching to have a lesser thickness than the flexure 28 generally.

In FIGS. 4A and 4B, the second attachment structure 54 comprise the tab 64 formed as simply a flat 643. First attachment structure-26 also comprises a flat part 221 of the rigid portion 22. The flat 643 and flat part 221 are juxtaposed and welded, see FIG. 4B.

In a preferred embodiment then, the invention provides a single piece suspension 10 and actuator arm 12, the suspension load beam having an integrated flexure 28 and hinge 32 each formed of the same web 34 as the load beam, the hinge being disposed between the flexure and the distal end 36 of the load beam rigid portion 22.

The flexure 28 comprises a frame 38, a cantilevered tongue 52 within the frame, and a second attachment structure 54 complementary to the first attachment structure 26. The flexure 28 is foldable at the hinge 32 to lie over angled to or generally parallel with the load beam rigid portion 22. The flexure second attachment structure 54 is engaged with the rigid portion first attachment structure 26 to secure the flexure in its folded over condition to the load beam 14. A dimple 24 is formed in the rigid portion 22 to be opposite the tongue 52 for gimballing of the slider 92, attached to tongue 52, about the dimple. A third attachment structure 64 is defined by the load beam base portion 16, the actuator arm 12 defining cooperating attachment structure 72 for attaching the load beam 14 to the actuator arm by the third attachment structure. In this embodiment, typically, one or more of the attachment structures 26, 54, 64 and 72 comprise a tab 641 and slot 721 arrangement, the tab comprising deflectable prongs 66, 68 that pass through the slot in deflected condition and lock in the slot in their undeflected condition to effect attachment between the tab and slot.

With reference to FIGS. 7, 8 and 9, various forms of the hinge 32 are shown. In FIG. 7, hinge 327 comprises a flat extent 102 of the load beam web 34. Hinge extent 102 has a center portion 104 and distal and proximate transverse notches 106, 108 on opposite sides of the center portion. The center portion 104 has a length such that the tongue 527 lies parallel to the load beam rigid portion 22 in dimple 24 engagement in the folded over condition of the flexure 287, the hinge 327 being bent from the plane of the flexure and the rigid portion at the notches 106, 108.

In FIG. 8, hinge 328 has a flat hinge extent 110 that has a center portion 112, a center notch 114, and distal and proximate transverse notches 116, 118 on either side of the center portion notch and opening oppositely thereto. The hinge extent center portion 112 has a length such that the tongue 528 lies parallel to the load beam rigid portion 22 in dimple 24 engagement in the folded over condition of the flexure 288. Hinge 328 is bent on itself at the center notch 114.

In FIG. 9, hinge 329 comprises an arcuate extent 122 formed from the load beam web 34. Hinge arcuate extent 122 has distal and proximate notches 124, 126 formed therein at its intersection with the flexure 289 and the load beam rigid portion 22. Notches 124, 126 are curved oppositely from the arcuate extent 122 to provide resiliency in the hinging of the flexure 289 to the rigid portion 22 as a function of the flexing of the arcuate extent. Tongue 529 thus engages dimple 24.

The invention thus provides an improved disk drive suspension, and at substantial cost savings through simplification of the manufacturing process and the elimination of unneeded process steps by integrating the load beam and flexure and the actuator arm attachment structures while maintaining the traditional flexure features of a tongue and frame flexure in a separate plane from the load beam. The invention provides novel hinging and fastening features that enable the ready manufacture of a single piece suspension that is snapped together from its flat, as-formed condition into its final configuration and snapped together with the actuator arm as well, and includes various hinging structures that will vary in stiffness and tongue orientation relative to the load beam and dimple for different levels of softness in springing of the slider. The foregoing objects are thus met.

I claim:

1. A single piece suspension attachable to an actuator arm, said suspension comprising a load beam having a base portion, a spring portion, and a rigid portion and rearwardly thereof a first attachment structure, said load beam having an integrated flexure and hinge each formed of the same web as the load beam, said hinge being disposed between said flexure and the distal end of said rigid portion; said flexure comprising a frame, a cantilevered tongue within said frame, said rigid portion or tongue defining a dimple, and a second attachment structure complementary to first attachment structure, said flexure being foldable at said hinge to lie over and generally parallel with said rigid portion with the flexure tongue and said rigid portion being registered with said dimple, said flexure second attachment structure being engaged with said first attachment structure to secure said flexure in its folded over condition to said load beam.

2. The single piece suspension according to claim 1, in which said load beam base portion defines a third attachment structure adapted to engage said actuator arm.

3. The single piece suspension according to claim 2, in which said third attachment structure comprises a tab projecting normally to said base portion, and including also said actuator arm having a cooperating attachment structure for securing said base portion to said actuator arm.

4. The single piece suspension according to claim 3, in which said cooperating attachment structure comprises a slot, said third attachment structure tab comprising deflectable prong sections that pass through said slot in deflected condition and lock in said slot in their undeflected condition for attaching said load beam base portion to said actuator arm.

5. The single piece suspension according to claim 3, in which said cooperating attachment structure comprises a first flat, said third attachment structure tab comprising a second flat opposing said first flat, said first and second flats being weldable to each other to attach said load beam base portion to said actuator arm.

6. The single piece suspension according to claim 1, in which said first attachment structure comprises a slot, said second attachment structure comprising a tab projecting normally to said to said flexure and adapted to be received in said slot in attaching relation of said flexure to said rigid portion.

7. The single piece suspension according to claim 6, in which said second attachment structure tab comprises deflectable prong sections that pass through said slot in deflected condition and lock in said slot in their undeflected condition for attaching said flexure to said rigid portion.

8. The single piece suspension according to claim 6, in which said load beam defines a third attachment structure comprising a tab projecting normally to said base portion, and including also an actuator arm having a cooperating attachment structure for securing said base portion to said actuator arm.

9. The single piece suspension according to claim 8, in which said cooperating attachment structure comprises a slot, said third attachment structure tab comprising deflectable prong sections that pass through said slot in deflected condition and lock in said slot in their undeflected condition for attaching said load beam base portion to said actuator arm.

10. The single piece suspension according to claim 6, in which said first attachment structure comprises a first flat, said second attachment structure tab comprising a second flat opposing said first flat, said first and second flats being weldable to each other to attach said flexure to said rigid portion.

11. The single piece suspension according to claim 1, in which said hinge comprises left and right elements spaced from and parallel to the long axis of said load beam, said elements being within a plane including said rigid portion and bounded by the outer edges of said flexure frame.

12. The single piece suspension according to claim 11, in which said rigid portion has a center section extending distally, said hinge being supported by said center section.

13. The single piece suspension according to claim 1, in which said hinge comprises left and right elements spaced from and parallel to the long axis of said load beam, said elements being without a plane including said rigid portion and bounded by the outer edges of said flexure frame.

14. The single piece suspension according to claim 13, in which said rigid portion has a center section extending distally, and left and right outboard sections also extending distally parallel with and spaced from said center section, said outboard sections supporting said flexure, said outboard sections having opposed extents each defining said hinge.

15. The single piece suspension according to claim 14, in which said extents are etched to a lesser thickness than said outboard sections generally.

16. A single piece suspension and actuator arm, said suspension comprising a load beam having a base portion, a spring portion, and a rigid portion defining a first attachment structure, said load beam having an integrated flexure and hinge each formed of, the same web as the load beam, said hinge being disposed between said flexure and the distal end of said rigid portion; said flexure comprising a frame, a cantilevered tongue within said frame, and a second attachment structure complementary to first attachment structure, said flexure being foldable at said hinge to lie over said rigid portion, said flexure second attachment structure being engaged with said first attachment structure to secure said flexure in its folded over condition to said load beam; a dimple extending between said rigid portion and said tongue, and third attachment structure defined by said base portion, said actuator arm defining cooperating attachment structure for attaching said load beam to said actuator arm by its said third attachment structure.

17. The single piece suspension according to claim 16, in which one or more of said attachment structures comprise a tab and slot arrangement.

18. The single piece suspension according to claim 17, in which said tab comprises deflectable prong sections that pass through said slot in deflected condition and lock in said slot in their undeflected condition to effect attachment between said tab and slot.

19. The single piece suspension according to claim 16, in which said flexure frame has longitudinal extents, said longitudinal extents being etched to have a lesser thickness than said flexure generally.

20. The single piece suspension according to claim 16, in which said hinge is etched to have a lesser thickness than said rigid portion generally.

21. The single piece suspension according to claim 16, in which said hinge comprises a flat extent of said load beam web.

22. The single piece suspension according to claim 21, in which said flat hinge extent has a center portion and distal and proximate transverse notches on opposite sides of said center portion, said center portion having a length such that said tongue lies parallel to said rigid portion in dimple engagement in the folded over condition of said flexure, said hinge being bent from the plane of said flexure and said rigid portion at said notches.

23. The single piece suspension according to claim 21, in which said flat hinge extent has a center portion, a center notch, and distal and proximate transverse notches on opposite sides of said center portion notch, said center portion having a length such that said tongue lies parallel to said rigid portion in dimple engagement in the folded over condition of said flexure, said hinge being bent on itself at said center notch.

24. The single piece suspension according to claim 16, in which said hinge comprises an arcuate extent formed from said load beam web, said arcuate extent having distal and proximate notches formed therein at its intersection with said flexure and said rigid portion, said notches being curved oppositely from said arcuate extent to provide resiliency in the hinging of said flexure to said rigid portion as a function of the flexing of said arcuate extent.

25. A single piece suspension attached to an actuator arm, said suspension comprising a load beam having a base portion, a spring portion, and a rigid portion defining a dimple and rearwardly thereof a first attachment structure, said load beam having an integrated flexure and hinge each formed of the same web as the load beam, said hinge being disposed between said flexure and the distal end of said rigid portion; said flexure comprising a frame, a cantilevered tongue within said frame, and a second attachment structure complementary to first attachment structure, said flexure being foldable at said hinge to lie over and generally parallel with said rigid portion with the flexure tongue registered with the rigid portion dimple, said flexure second attachment structure being engaged with said first attachment structure to secure said flexure in its folded over condition to said load beam; said load beam base portion defining a third attachment structure adapted to engage said actuator arm, said third attachment structure comprising a tab projecting normally to said base portion, said actuator arm defining a cooperating attachment structure for securing said base portion to said actuator arm, said cooperating attachment structure comprising a slot, said third attachment structure tab comprising deflectable prong sections that pass through said slot in deflected condition and lock in said slot in their undeflected condition for attaching said load beam base portion to said actuator arm; said first attachment structure comprising a slot, said second attachment structure comprising a tab projecting normally to said to said flexure and adapted to be received in said slot in attaching relation of said flexure to said rigid portion, said second attachment structure tab comprising deflectable prong sections that pass through said first attachment slot in deflected condition and lock in said first attachment slot in their undeflected condition for attaching said flexure to said rigid portion; said hinge comprising left and right elements spaced from and parallel to the long axis of said load beam, said elements being within a plane including said rigid portion.

* * * * *